United States Patent [19]

Milutzki et al.

[11] 4,266,783

[45] May 12, 1981

[54] CONTROL MECHANISMS FOR PICK-UP ARMS OF RECORD PLAYERS

[75] Inventors: Udo Milutzki, Walldorf; Harry Gaus, Kronberg; Dietwald Schotte, Eschborn; Klaus Ramspeck, Frankfurt, all of Fed. Rep. of Germany

[73] Assignee: Braun Aktiengesellschaft, Kronberg, Fed. Rep. of Germany

[21] Appl. No.: 886,455

[22] Filed: Mar. 14, 1978

[30] Foreign Application Priority Data

Mar. 19, 1977 [DE] Fed. Rep. of Germany ....... 2712186

[51] Int. Cl.³ .............................................. G11B 3/08
[52] U.S. Cl. ..................................... 369/41; 369/216
[58] Field of Search .............. 274/9 R, 9 RA, 13, 14, 274/15, 23 R, 23 A; 200/DIG. 1, DIG. 34; 307/116, DIG. 2

[56] References Cited

U.S. PATENT DOCUMENTS

3,715,540  2/1973  Larson ........................... 200/DIG. 1
3,787,732  1/1974  Larson ........................... 200/DIG. 1

FOREIGN PATENT DOCUMENTS

2413972  9/1974  Fed. Rep. of Germany ........ 274/23 R
474040  9/1975  U.S.S.R. ................................ 274/23 R

OTHER PUBLICATIONS

Bulletin: "Pushbutton Switch With No Moving Parts", R. A. Johnson.

*Primary Examiner*—Harry N. Haroian
*Attorney, Agent, or Firm*—Fishman and Van Kirk

[57] ABSTRACT

A control mechanism for raising, swinging and lowering the pick-up arm of a record player comprising a disc having an arcuately shaped depression in the periphery thereof. The contacts of an electrical contact sensor switch are located in the disc peripheral depression and bridging of these contacts will cause generation of a first command signal for the control mechanism. Devices for generating second and possibly third command signals are associated with the disc which may be rotatably mounted.

6 Claims, 9 Drawing Figures

CONTROL MECHANISMS FOR PICK-UP ARMS OF RECORD PLAYERS

BACKGROUND OF THE INVENTION (1) Field of the Invention

The invention relates to a control mechanism for raising, swinging and lowering the pick-up arm of a record player.

(2) Description of the Prior Art

Generally speaking, the turntable and the pick-up arm of a record player are put into operation by activating a mechanical switch which is locked in position for a predetermined amount of time. During this predetermined time the electrical and mechanical working parts of the record player supply a control command to the pick-up arm and turntable to set them in motion and eventually locate the pick-up arm so that the pick-up cartridge rides on the record to be played. Although in many cases the drives for the turntable and pick-up arm are mechanically coupled to be actuated together, it is also possible to separate the drive for the turntable and the drive for the pick-up arm to provide for independent operation of the turntable and the pick-up arm. When providing for the operation of the pick-up arm, it is desirable to provide a control mechanism for raising, swinging and lowering the pick-up arm.

German Pat. No. 1,917,241 discloses a control mechanism for raising, swinging and lowering the pick-up arm of record players in which separate drives are provided for the turntable and the pick-up arm. The raising of the pick-up arm is accomplished by means of an electronic contact switch which is activated by touching a handle which can be either a knob or a slider. A separate electromechanical arrangement is provided for lowering of the pick-up arm and a third electromechanical arrangement is provided for swinging of the pick-up arm. It should be understood that it is difficult and expensive to provide for these various independent electromechanical arrangements.

It is an object of the invention to provide a simplified control mechanism for raising, swinging and lowering the pick-up arm of a record player which provides for relatively easy control of movements of the pick-up arm.

SUMMARY OF THE INVENTION

The present invention provides a control mechanism for raising, swinging and lowering a pick-up arm of a record player. The control mechanism includes a body, such as, for example, a disc having a depression thereon which, on the surface of the depression, includes a contact sensor switch which may be activated by a person using the record player. The contact switch is connected to the pick-up arm of the record player and provides for raising of the pick-up arm when the switch is activated and provides for lowering of the pick-up arm when the switch is deactivated. In order to swing the pick-up arm one way or another, a person using the record player engages his finger in the depression and rotates the disc. The pick-up arm is moved radially inwardly with respect to the record to be played when the disc is rotated one way and the pick-up arm is moved radially outwardly with respect to the record to be played when the disc is rotated the other way. In one embodiment of the invention the further the disc is rotated from the off position, the faster is the speed of movement of the pick-up arm.

In another embodiment of the invention, the control mechanism is a disc whose rotation to one side or the other side closes a circuit operatively connected to the pick-up arm which functions to raise the pick-up arm until a predetermined voltage threshold value is reached. On exceeding this threshold value the pick-up arm is swung outwardly in accordance with the direction in which the disc is rotated. The speed of swinging of the pick-up arm may be controlled by the amount of rotation of the disc.

According to a further embodiment of the present invention, the control mechanism comprises a disc having a depression therein which includes three contact sensor switches. When one switch is actuated the pick-up arm is raised. When the switch is deactuated the pick-up arm is lowered. The second and third switches activate respectively the movement of the pick-up arm in one or the other direction. The second and third contact switches may be pressure sensitive, such as, for example, a piezoelectric switch, so that the speed of movement of the pick-up arm corresponds to the pressure applied to the switch.

BRIEF DESCRIPTION OF THE DRAWINGS

FIG. 4a shows a top view of the control mechanism of FIG. 4;

FIG. 5a shows a top view of the control mechanism of FIG. 5;

DETAILED DESCRIPTION OF THE INVENTION

Figure 1:
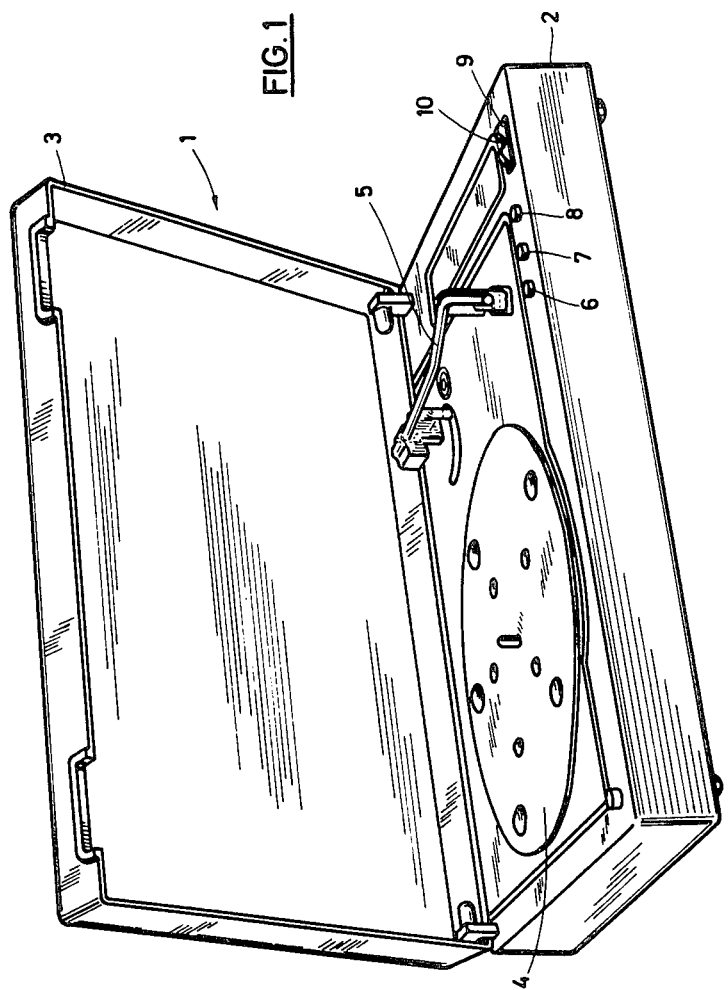
FIG. 1 shows a perspective view of a record player including the control mechanism.

Referring to FIG. 1, record player 1 includes base 2 and lid 3 pivotally connected to base 2. Turntable 4, pick-up arm 5 and various operating controls 6, 7 and 8 are provided on the base 2. A control mechanism, which is the subject matter of the present invention, includes a control member 9 and is positioned within base 2 and provides for raising of pick-up arm 5 above the surface of a record to be played on turntable 4 and also provides for lowering of pick-up arm 5 to the surface of the record so that the needle of the pick-up cartridge engages the grooves of the record. The control mechanism also provides for movement of pick-up arm 5 radially inwardly toward and radially outwardly away from the center of turntable 4 to allow for positioning of the cartridge of pick-up arm 5 at the desired position on a record to be played on turntable 4.

Figure 2:
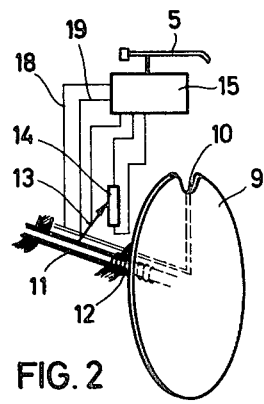
FIG. 2 shows a schematic view of one embodiment of the control mechanism for the record player pick-up arm shown in FIG. 1.
Figure 3:
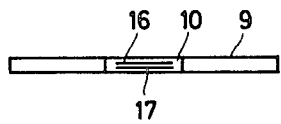
FIG. 3 shows a top view of the control disc of the control mechanism shown in FIG. 2.

Referring to FIGS. 1, 2 and 3, the control member 9 of the control mechanism comprises a round flat disc including a depression 10 on the periphery thereof. Depression 10 is arcuately shaped to provide for engagement thereof by the fingertip of a user of the record player. During the operation of pick-up arm 5, the person operating pick-up arm 5 places his finger in depression 10 of disc 9. By placing his finger in depression 9, the operator galvanically bridges two electrical contacts 16 and 17 located on the surface of depression 10 (FIG. 3). Contacts 16 and 17 are connected to electrically conductors 18 and 19 (FIG. 2) which are connected to input terminals of a drive mechanism 15 which controls the raising and lowering pick-up arm 5. Thus, when contact 16 and 17 are bridged by a finger or any other partially conductive object, pick-up arm 5 is raised. When the connection between contact 16 and 17 is broken, pick-up arm 5 is lowered.

Disc 9 is connected at its center to spindle 11 around which is positioned a return spring 12 which urges spindle 11 and disc 9 to a position where depression 10 is positioned vertically above the center of disc 9. The wiper arm 13 of a potentiometer 14, is mounted on spindle 11 and electrically connected to a control circuit in drive mechanism 15 which provides for swinging of pick-up arm 5 in response to rotation of disc 9. As disc 9 is rotated to the left, wiper arm 13 of potentiometer 14 is moved upwardly to cause current of a first polarity to flow to the control circuit in drive mechanism 15 which controls the inward and outward swinging of the arm 5. Once the operator's finger is placed in depression 10 to raise pick-up arm 5, the operator may turn disc 9 to the left to move the pick-up arm 5 radially inwardly with respect to the turntable. A large angular deflection of disc 9 provides for greater magnitude of current flow and consequently a high pick-up arm swinging speed and a relatively small deflection provides for a low pick-up arm swinging speed. The pick-up arm 5 moves radially outwardly from the center of the turntable if disc 9 is rotated to the right. As disc 9 is rotated to the right, wiper arm 13 of potentiometer 14 is moved downwardly to cause current of the second; i.e., opposite; polarity to flow to the arm swinging control circuit in drive mechanism 15. It should be understood that potentiometer 14 may be replaced by an optical, magnetic or piezoelectric control which is dependent upon the rotation of spindle 11. German Pat. No. 1,917,241 discloses the preferred mechanism by which a current change to drive mechanism 15 results in the change in speed of the pick-up arm. When depression 10 is positioned vertically with respect to the center of disc 9, the wiper arm 13 of potentiometer 14 provides for no current flow to drive mechanism 15.

Although it is preferred that control mechanism comprise a round disc, it should be understood that other configurations may be used which are capable of rotating spindle 11 and moving wiper arm 13 of potentiometer 14 in the above described manner.

In another embodiment of the present invention the contact sensor switch comprising contacts 16 and 17 may be eliminated, and the raising of pick-up arm 5 is caused when the disc 9 is rotated one way or the other way. With a small rotation of disc 9, a first control voltage is produced and results in raising pick-up arm 5. The lowering of voltage caused by relocation of depression 10 in the vertical position provides a second voltage threshold which lowers pick-up arm 5. During movement of pick-up arm 5 radially inwardly or radially outwardly, mechanical detents or the like on pick-up arm 5 provide for maintenance of the height of pick-up arm 5 as it is positioned above the record to be played.

Figure 4:
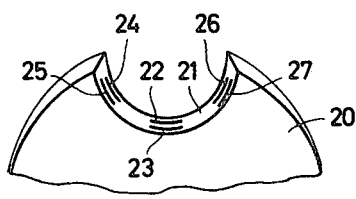
FIG. 4 shows a distorted frontal view of another embodiment of a control disc for a control mechanism for the record player shown in FIG. 1.

In another embodiment of the invention, as shown in FIGS. 4 and 4a disc 20 includes, at its periphery, depression 21. Depression 21 includes three contact switches each including respectively contacts 22 and 23; 24 and 25; and 26 and 27. In this embodiment disc 20 need not be rotated to operate pick-up arm 5. Pick-up arm 5 is raised by bridging central contacts 22 and 23 while swinging of the pick-up arm to the left is occasioned by the bridging of contacts 24 and 25. Swinging of the pick-up arm to the right is provided for by the bridging of contacts 26 and 27. One disadvantage of this embodiment is that it is not possible to modify the swinging speed of pick-up arm 5.

Figure 5:
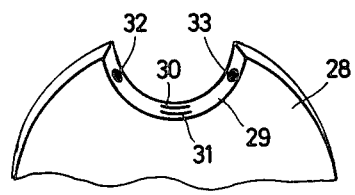
FIG. 5 shows a distorted frontal view of still another embodiment of a control disc for a control mechanism for the record player shown in FIG. 1.

As shown in FIGS. 5 and 5a, it is possible to modify the control mechanism shown in FIG. 4 by providing a disc 28 having a depression 29 on its periphery which includes a contact sensor switch having contacts 30 and 31 and pressure responsive switches 32 and 33 wherein the speed of swinging of pick-up arm 5 is a function of the pressure imposed on switches 32 and 33. Switches 32 and 33 may be of the piezoelectric type. The control mechanism shown in FIG. 5 can be modified by deleting contacts 30 and 31 and providing for actuation of raising and lowering of pick-up arm by initial actuation of pressure responsive contacts 32 or 33.

Figure 6:
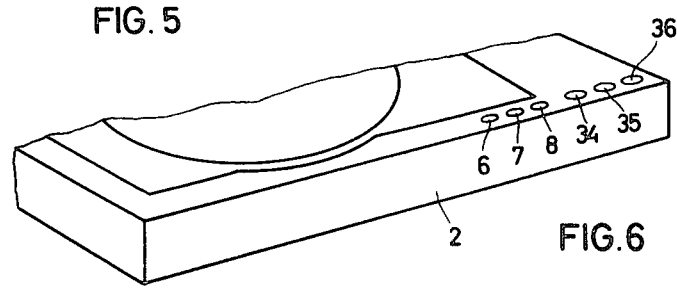
FIG. 6 shows a partial and perspective view of a record player with control buttons for the pick-up arm of the record player.

FIG. 6 shows a control mechanism arranged on record player 1 which includes three contact buttons 34, 35 and 36. In this case, central button 35 serves to raise and lower pick-up arm 5 while outer buttons 34 and 36 are used respectively for swinging movement of the pick-up arm inwardly and outwardly. If it is desired that the speed of the raising or swinging movement be variable, contact buttons 34, 35 and 36 can contain pressure responsive contacts, which may be of the piezoelectric type.

Figure 7:
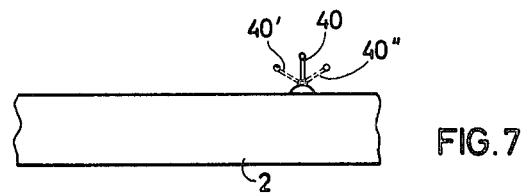
FIG. 7 shows a side view of another embodiment of the control mechanism.

In another embodiment shown in FIG. 7, the operating member is constructed like a control column. On gripping of the control column the pick-up arm is raised. By pivoting the control column to the right or left, the pick-up arm can be swung inwardly or outwardly. These two positions are designated by reference characters 40' and 40". It is obviously also possible to rotate by 90° the pivot plane of column 40 so that column 40 may be pivoted from front to rear rather than from left to right.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. In apparatus for controlling the movements of the tone arm of a record player relative to a turntable, the record player having base means on which the turntable and tone arm are supported, said apparatus including means for controlling the position of the pick-up supporting end of the tone arm in response to command signals, improved command signal generating means comprising:

a rotatable control disc, said disc being mounted on the base means of the record player, said disc being provided with a recess in an exposed peripheral edge portion thereof;

first command signal generating means mounted on said disc, said first command signal generating means including touch sensitive means positioned in said recess for producing an electrical output signal upon insertion of the finger of a user in said disc peripheral recess;

means for coupling signals provided by said first command signal generating means to the position control means associated with the tone arm;

second command signal generating means coupled to said disc, said second command signal generating means being operable in response to rotation of said disc under control of the user's finger in said disc peripheral recess to generate a second command signal; and means for coupling signals provided by said second command signal generating means to the position control means associated with the tone arm.

2. The apparatus of claim 1 wherein said second command signal generating means comprises potentiometer means, rotation of said disc varying the position of a wiper arm of said potentiometer means with respect to a resistance element to thereby generate a second command signal.

3. The apparatus of claim 1 wherein said first command signal generating means comprises a pair of spacially displaced electrical contacts, the contacts of said pair being positioned within said disc peripheral recess so as to permit the establishment of an electrical circuit therebetween by a user's finger located in said recess.

4. The apparatus of claim 3 further comprising:
third command signal generating means, said third command signal generating means comprising a pair of spacially displaced electrical contacts, the contacts of said third pair being positioned within said disc peripheral recess so as to permit the establishment of an electrical circuit therebetween.

5. The apparatus of claim 1 wherein said first command signal generating means comprises:
pressure-sensitive transducer means mounted on said disc in said peripheral recess whereby manipulation of a user's finger in said recess may apply pressure to said transducer to generate a command signal.

6. The apparatus of claim 3 further comprising:
third command signal generating means, said third command signal generating means comprising a pressure-sensitive transducer mounted on said disc in said peripheral recess whereby manipulation of a user's finger in said recess may apply pressure to said transducer to generate a command signal.

* * * * *